Aug. 15, 1967 A. M. PALSAK 3,336,020
FURNACE FOR HEATING SCRAP METAL
Filed Oct. 23, 1964 2 Sheets-Sheet 1

INVENTOR.
ANDREW M. PALSAK
BY
his Attorney

Aug. 15, 1967  A. M. PALSAK  3,336,020
FURNACE FOR HEATING SCRAP METAL
Filed Oct. 23, 1964  2 Sheets-Sheet 2

INVENTOR.
ANDREW M. PALSAK
BY
his Attorney $$\text{United States Patent Office}$$

3,336,020
Patented Aug. 15, 1967

3,336,020
FURNACE FOR HEATING SCRAP METAL
Andrew M. Palsak, Butler, Pa., assignor to Koppers Company, Inc., a corporation of Delaware
Filed Oct. 23, 1964, Ser. No. 405,932
6 Claims. (Cl. 266—5)

ABSTRACT OF THE DISCLOSURE

A scrap preheating furnace is comprised of refractory lined walls having a movable enclosure over the walls and having water-jacketed lower wall portions that slope downwardly and converge toward an aperture at the bottom. One sloping wall portion is movable laterally away from the other fixed walls to enlarge the bottom aperture and discharge the heated scrap metal from the furnace into a mobile scrap charging car. Heat enters the furnace at a level above the scrap and exhausts through the aperture in the bottom, thereby passing through the scrap and preheating it.

---

This invention relates to furnaces, method of operation thereof, and, more particularly, to a metallurgical type furnace for preheating scrap metal and methods of operation thereof.

A basic oxygen converter for making steel is generally a cylindrical vessel which is closed at one end and open at the other end, and which may be rotated about a horizontal axis for charging and unloading. Within this vessel, oxygen of high purity is directed onto or into the surface of the molten metal to oxidize impurities in the hot metal.

The initial charge in the basic oxygen converter usually includes hot molten metal from a reduction furnace, additives such as burnt lime, and a quantity of relatively cold scrap metal. Ordinarily, the scrap metal is not preheated, but, during the later stages of the process, cold scrap metal is introduced into the vessel periodically, along with other ingredients, as a temperature control medium. The scrap is usually moved from a storage area, loaded into scrap charging boxes, which have been weighed, and then transported to the furnace region. The furnace vessel is usually tilted about its horizontal axis, to a convenient angle, and the scrap is then charged into the furnace.

It is evident then that the introducion of relatively cold scrap into the molten bath of a basic oxygen furnace can radically change the heat balance to such an extent that considerable additional oxygen must be consumed during the oxygen blow period.

In the present invention, the scrap metal is removed from the storage area in the usual manner, but, before it is charged into the converter, it is placed in a scrap preheat furnace of the present invention wherein it is heated to a temperature of about 1500° F. Gas, oil, or any other suitable heat source may be used to raise the temperature of the scrap. Such a furnace for heating scrap metal includes a first pair of spaced apart substantially vertical walls, with a second pair of walls disposed between said first pair of walls and sloping convergently downward, forming at the bottom of the furnace an aperture bounded by the periphery of the walls. A removable closure member covers the top of the furnace and is sealed around its periphery to the edges of the furnace walls. The heat is introduced into the furnace, preferably, above the level of scrap metal and exhausted below the bottom level of the scrap metal. In this manner, a more uniform heat distribution throughout the scrap metal is achieved. When the scrap metal has reached a temperature of about 1400°–1500° F., a portion of one of the sloping side walls is moved laterally to enlarge the bottom aperture and discharge the scrap from the furnace into a scrap charging box which has been placed advantageously below the furnace.

Scrap metal which has been preheated, in accordance with this invention, to a temperature of about 1500° F. will not appreciably disturb the heat balance in the furnace. Moreover, a considerably smaller quantity of oxygen will be required as compared to the oxygen used when cold scrap is introduced into the converter.

For a further understanding of the present invention, and for advantages and features thereof, reference may be made to the following description taken in conjunction with the accompanying drawings.

Figure 1:
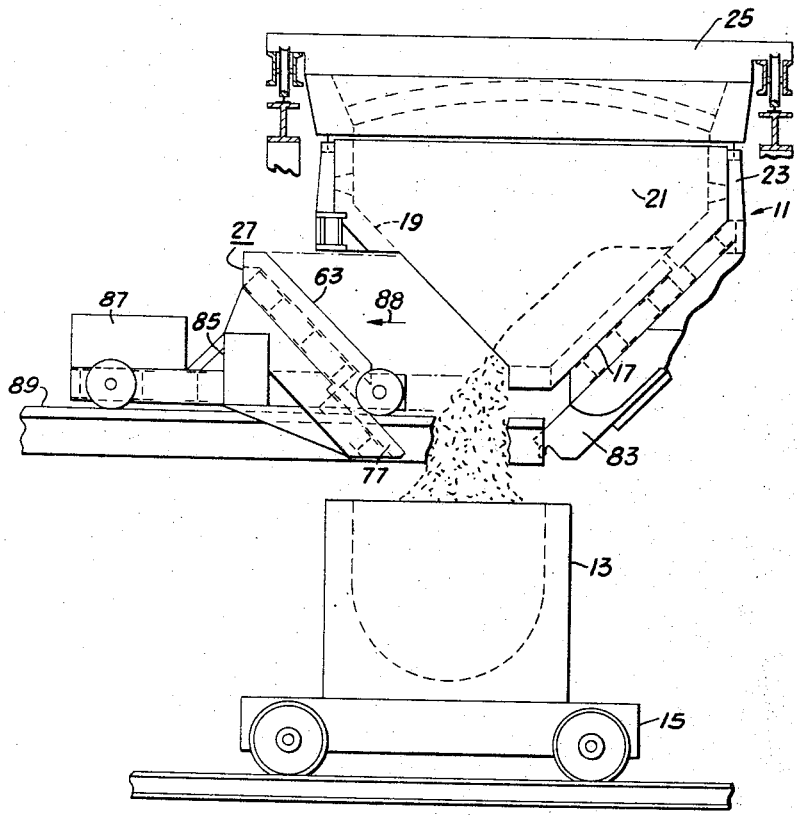
FIG. 1 is a schematic elevational view of a scrap preheat furnace constructed in accordance with a preferred embodiment of the present invention.

Referring to FIG. 1, a scrap preheat furnace 11, constructed in accordance with the present invention, is shown in an operative fixed position, with one of a plurality of conventional scrap boxes 13 supported on a mobile transfer car 15, disposed in an operative position beneath the furnace 11. A movable wall 27 of the furnace 11 is shown displaced laterally toward the left, and heated scrap material in the furnace is being discharged into the scrap box 13.

The scrap preheat furnace 11 is basically a frustum of a hollow wedge having two opposed sloping walls 17, 19, and two opposed front and rear vertical walls 21; only the front wall being shown. The walls 17, 19, 21 connect to other vertical walls 23, in the form of a rectangular box connected to the top of the walls 17, 19, 21. The furnace 11 is also provided with a movable cover 25.

The sloping wall 17 is disposed and fixed between the two opposing vertical front and rear walls 21, but the other sloping wall 19 is provided with a movable lower portion 27 which is adapted to move laterally. The upper portion of the sloping wall 19 is similar to the fixed sloping wall 17, and both the sloping walls 17, 19 include a water wall lower portion 29, and a refractory upper portion 31 (see FIG. 2).

The water wall portion 29 comprises an inner plate 33, which extends over the inner surface of the refractory wall portion 31, and a plurality of hollow water cooled panels 35. The water cooled panels 35 include parallel spaced apart upper and lower plates 37, 39, and end plates 41, 43, which may be perimetrically connected in any suitable manner to the upper and lower plates 37, 39. Additional diaphragm plates (not shown) may be interposed and fixed between the upper and lower plates 37, 39, if desired, to provide structural rigidity and to maintain the upper and lower plates in position. The water cooled panels 35 may be bolted or otherwise suitably fastened to the inner plate 33, but is is preferred to fasten them in such a manner that they may readily and easily removed to effect repairs or maintenance. It is a feature of the present invention, that the inner plate and water cooled panels may be fabricated and installed as replaceable units.

Figure 2:
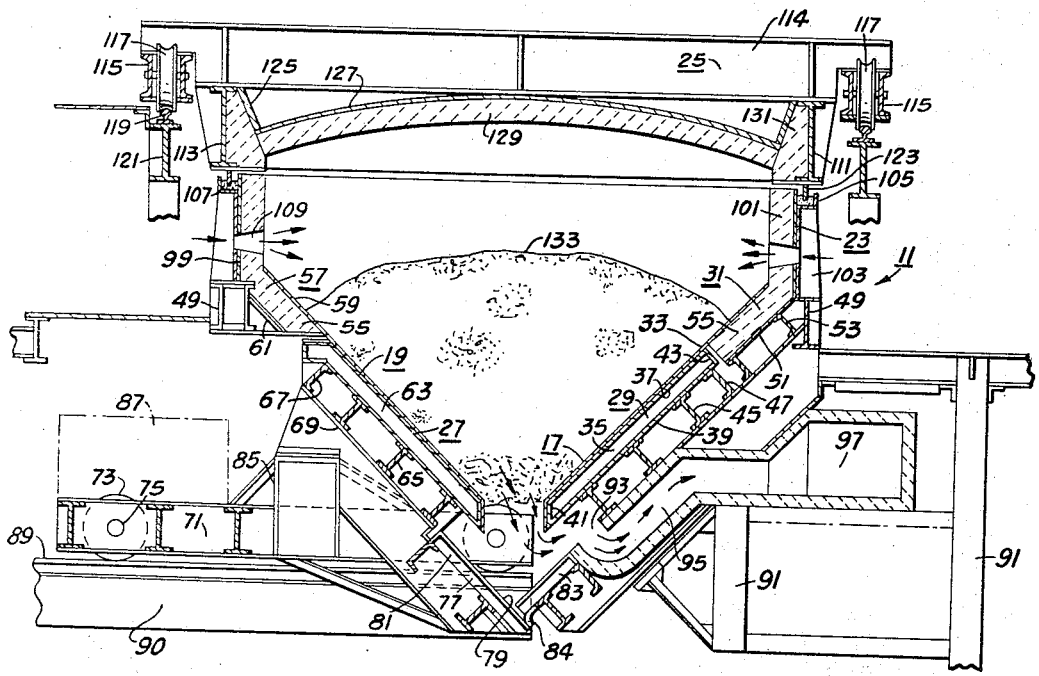
FIG. 2 is a vertical sectional view of the furnace of FIG. 1.

The panels 35 are supported by structural members, such as I-beams 45 and channels 47, which bear against and are suitably fixed to other appropriate surrounding structure 49, about as shown in FIGS. 1 and 2.

The refractory upper portion 31 includes a portion of the inner plate 33, as mentioned previously, and a spaced apart parallel outer plate member 51, which is fastened to other channel members 53, supported by the appropriate surrounding structure 49. The space between the inner plate portion 33 and the outer plate member 51 is filled with a suitable type refractory material 55.

The sloping wall 19 includes a fixed upper sloping portion 57 and the previously mentioned laterally movable wall portion 27. The fixed upper sloping portion 57 is similar to the refractory upper portion 31 in that it includes spaced apart parallel inner and outer plates 59, 61 respectively, and refractory material 55 interposed therebetween. In like manner, the upper sloping portion 57 is fixed to and supported upon the suitable surrounding structure 49.

The laterally movable lower wall portion 27 includes a plurality of water cooled panels 63, which are similar to the water cooled panels 35, and they are supported by structural members, such as the I-beams 65 and channel 67. These structural members 65, 67, are fixed to and are supported by a sloping plate 69 which is fixed to a carriage frame 71, mounted upon conventional wheels and axles 73, 75. There is fixed to the lower front end portion of the carriage frame 71, a sloping wall extension 77 disposed in spaced parallel relation to the panels 63. Such wall extension 77 includes a top plate 79 and a plurality of stiffeners, such as bars 81, which may be conveniently welded to the plate 79. A similar lower sloping wall extension 83 is fixed to and supported in spaced parallel relation to the sloping wall 17, as may be noticed by referring to FIG. 2. The lower end of the wall extension 83 is provided with an arcuate resilient member 84 which bears against the inner surface of the wall extension 77 and seals the bottom of the furnace when the movable wall portion is in the operative position shown in FIG. 2.

In a preferred embodiment of the invention, the lower sloping wall extensions 77, 83, are not water cooled, as are the upper sloping walls 17, 19, nor are they lined with refractory material 55. The reason for this is that the greatest heat, as will be explained hereinafter, is at the top of the furnace. The structure at the level of the wall extensions 77, 83, then, will not require protection from the heat, at its respective level, which is less than at the top of the scrap load. However, in some applications it may be desirable and necessary to include either water cooled panels, or refractory material, as a part of the structure of the sloping wall extensions 77, 83.

The sloping wall 27 and wall extension 77 may be fixed to and supported by any suitable structure, such as a transversely extending box beam structural member 85, which is welded to the main carriage frame 71. The carriage frame 71 also supports a conventional prime mover 87, which may be an electric motor (not shown) that is operatively connected to the axle 75 through conventional mechanism, such as gear and pinion arrangements. The carriage 71 is supported and movable upon suitable rails 89 fixed to any convenient adjacent supporting structure 90.

The lower wall extension 83 is fixed to and supported by other similar I-beam, plate and channel beam members, which are fixed conveniently to adjacent supporting structure 91. In the supporting structure beneath the sloping wall 17, there are a plurality of exhaust gas ports 93, each of which communicates with an auxiliary, refractory lined exhaust gas duct 95 that communicates with a single transversely extending main exhaust gas duct 97.

The front and rear vertical walls 21 include outer planar plates to which suitable refractory material is connected in the usual manner. Water cooled panels, in a preferred embodiment of the invention, are not provided for the vertical walls 21 for the reason that there is apt to be little or no abrasion of these walls by the scrap, when it is loaded into the furnace. In some applications, however, it may be found desirable to provide an inner plate, such as plate 33, over the refractory material to protect it. If necessary, a plurality of water cooled panels similar to the panels 35, 63, may be installed.

As mentioned previously, both the sloping walls 17, 19, and the front and rear vertical walls 21, merge with a box-like top portion having vertical refractory lined walls 23. These walls 23 include a vertical outer plate 99 to which a suitable refractory material 101 is fastened in the usual manner, and the outer plate 99 is suitably stiffened and maintained in a vertical position by a plurality of flanged plate stiffeners, such as shown at 103. The upper edge of the stiffeners 103 abuts the bottom surface of an angle member 105 which forms, with the upper portion of the vertical plate 99, a channel in which a suitable conventional type sealant material 107, such as sand, is disposed for a purpose to be described hereinafter.

Approximately midway in both of the opposed vertical end plates which are fixed to the sloping walls 17, 19, and in the refractory 99, 101 also, there is provided a plurality of burner ports 109. These ports 109 are adapted to receive a conventional gas or oil burner for use in heating the scrap within the furnace, but the ports 109, of course, may be adapted to receive any heating source that may be preferred in a particular application.

The movable cover 25 also has a box-like form which is provided by spaced parallel structural members such as the I-beams 111, 113, shown in FIG. 2. Disposed transversely across the top of the I-beam members 111, 113 are a plurality of other structural members 114, which extend beyond the structural members 111, 113, and which provide convenient supports for wheel housings 115 and wheels 117 journaled therein. The rails 119 may be fixed to any convenient adjacent supporting structure 121 in such a manner that the wheels 117 engage the rails and the cover may be moved relative to the furnace.

Extending downwardly from the lower flange surface of the structural I-beam members 111, 113, is a sealing bar 123, which may be welded to the structural members and which extends around the perimeter of the movable cover 25. This bar 123 engages the sealant material 107, which may be sand, in the channel formed by the angle bar member 105, and thus seals the top of the furnace when it is being heated.

Between the inner edges of the structural members 111, 113, there are sloping side plates 125, which are joined to the periphery of an arcuate plate 127 touching the lower surface of the transversely extending beams 114. The inner surface of the arcuate plate 127 is covered with a layer of refractory material 129, which may be fastened to the plate in a conventional manner, and the edges of the refractory layer 129 engage suitable refractory abutments 131 affixed to and supported by the structural members 111, 113.

In the present invention, the scrap preheat furnace 11 is basically shaped like the frustum of a wedge having two opposite vertical side walls 21, and two opposite downwardly converging end walls 17, 19. It should be understood, that in some applications the furnace may be formed by a plurality of vertical walls and at least one downwardly sloping wall having a lower portion laterally movable in the manner described previously.

The furnace may be heated, of course, by burning either oil or gas, or by diverting heated gaseous products of combustion thereinto. Suitable types of stationary burners may be positioned in the ports 109, which are preferably located above the top level of the scrap in the furnace. It is evident then, that the hottest flame impinges upon the largest upper portion of scrap metal in the furnace. It will be noted also that the exhaust gas ports 93 are preferably located at the bottom of the furnace. Consequently, the heat at the top of the furnace is induced to permeate downward through the entire scrap load and to flow out of the furnace via the duct system 95, 97. That is to say, heat is forced through the scrap load so as to heat it more uniformly. Another feature of the invention is that the location of the ducts 93 at the bottom, where shown, lessens the possibility of a piece, or pieces, of scrap obstructing one or more gas duct ports. The exhaust gas duct ports could easily become clogged or obstructed if they were located in the sloping walls 17, 19 or vertical walls 21, at a higher level.

After first removing the cover, scrap is loaded into the furnace by using a clam shell-type scrap charging bucket, or any other suitable loading device. The first few loads of scrap naturally fall downward and collect in the bottom of the furnace, but will generally not pass through the aperture at the bottom thereof. As mentioned previously, the scrap should be loaded to a level 133, which should not exceed the height of the burner ports 109 in the walls 23. An inverted wedge frustum is the preferred shape of the furnace 11 of the present invention because the greatest proportion of scrap metal is at the top and nearest the source of heat. By using the furnace of the present invention, there is, therefore, a significant reduction of the time required to heat a load of scrap material.

After the furnace has been charged with a load of scrap, the burners are operated to ignite the fuel and generate heat. As an example, the scrap preheat furnace 11, shown in the embodiment, may hold 50 tons of scrap metal and the time required to heat this metal to an average temperature of 1400–1500° F. will be about 2.5 to 3.0 hours. Such an exemplary furnace has the general physical dimensions: 16 ft. x 20 ft. measured inside the top refractory box-like portion 23; a bottom opening or aperture 2 ft. x 20 ft.; and the depth of the wedge frustrum portion is about 7 ft.

When the scrap metal has reached an average desired temperature, of 1400°–1500° F., one of the transfer cars 15 supporting the scrap charging box 13, or other receptable, is positioned beneath the furnace, about as shown in FIG. 1. Then, by actuating the prime mover 87, the movable wall section 27 is retracted laterally, in the direction indicated by the arrow 88 in FIG. 1. The hot scrap metal then falls naturally from the furnace cavity into the scrap box. The scrap falls quickly and cleanly, with no spillage and without leaving any portion of the scrap in the furnace. The movable wall portion, of course, may be retracted at a variable rate of speed so as to control the rate of scrap discharge and to lessen the forces of impact which occur when the scrap is dumped into the scrap box.

The sloping wall surfaces naturally receive the greatest impact load when the scrap metal is charged into the furnace and are subjected to the greatest damage. The sloping walls, however, are provided with impact inner plates 59. The sloping walls 17, 19 are also provided with the water cooled panels 29, whereby the sloping walls are more effectively cooled. The panels also may be readily removed for maintenance and repair to the furnace walls. It is desirable, of course, that the impact metal plate cover 59 on the refractory portion of the sloping sides be of sufficient thickness to afford adequate protection to the refractory 55, from the impact of the scrap as it is loaded.

It was mentioned previously that there is a significant change in the heat balance within a basic oxygen furnace when relatively cold scrap is initially charged thereinto. Later on, when it is desirable to control the temperature of the melt, cold scrap is introduced purposely to control the temperature of the melt. But, initially, cold scrap reduces the temperature of the hot pig iron to such a degree that greater quantities of oxygen are required during the blow period.

Figure 3:
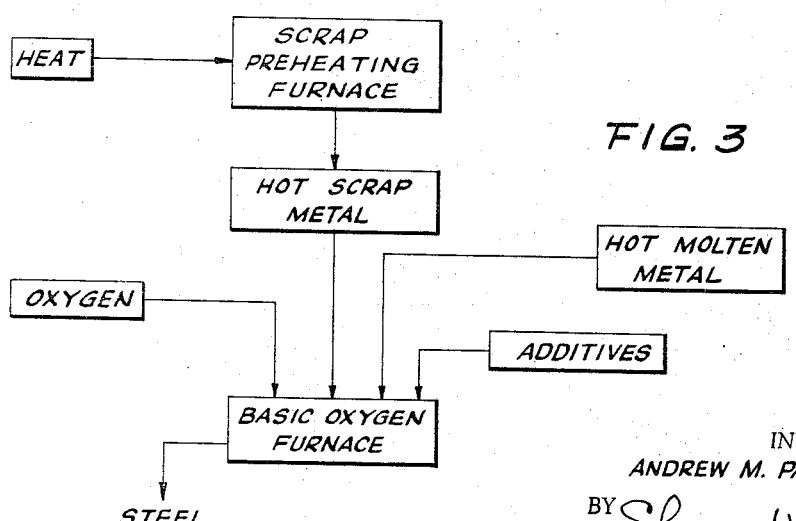
FIG. 3 is a schematic flow-diagram of a basic oxygen furnace system utilizing the scrap preheating furnace of FIG. 1.

The furnace of the present invention is associated with a basic oxygen furnace. The preheated scrap is quickly charged into the oxygen converter and there is practically no change in the heat balance within the converter. FIG. 3 illustrates schematically an arrangement of the preheat furnace 11 in a basic oxygen converter system.

From the foregoing, it will be apparent that the scrap preheating furnace of the present invention has many features and advantages not known heretofore. The furnace of the present invention possesses greater efficiency and effectiveness in use in te steel making process with greater consequent overall economy.

I claim:
1. A furnace for heating scrap metal comprising:
   (a) walls defining a cavity for holding scrap metal and and having a aperture at the bottom of said cavity;
   (b) said walls comprised of a plurality of walls with at least two walls being downwardly converging walls forming at the bottom of said furnace an aperture peripherally bounded by all of said walls, with the sloping converging wall portions having internal passages for fluid to course therein and cool and walls;
   (c) means to heat and furnace and the scrap metal therein; and
   (d) means to move at least a portion of one converging wall laterally away from the other said walls wherein the angle of convergence between said converging walls remains the same and whereby said aperture is enlarged and said scrap metal discharges from said furnace.
2. A furnace for heating scrap metal comprising:
   (a) walls defining a cavity for holding scrap metal and having an aperture at the bottom of said cavity;
   (b) said walls including a first pair of spaced apart substantially vertical walls and a second pair of walls associated therewith that converge downwardly to form an aperture at the bottom of said furnace bounded by all said walls, said walls having internal passages for fluid to course therein and cool said walls;
   (c) means to heat said furnace and the scrap metal therein; and
   (d) means to move at least a portion of one converging wall laterally away from the other said walls wherein the angle of convergence between said converging walls remains the same and whereby said aperture is enlarged and said scrap metal discharges from said furnace.
3. A furnace for heating scrap metal comprising:
   (a) a first pair of spaced apart substantially vertical walls;
   (b) a second pair of walls disposed between said first pair of walls and sloping convergently downward and forming at the bottom of said furnace an aperture peripherally bounded by all of said walls, said sloping walls having internal passages for cooling fluid to course therein and cool said walls;
   (c) means to move at least one sloping wall laterally away from the other said walls wherein the angle of convergence between said sloping walls remains the same and whereby said aperture is enlarged and said scrap metal discharges from said furnace;
   (d) a closure member covering the top of said furnace;
   (e) means to seal said cover to said furnace walls;
   (f) means to move said cover relative to said furnace wall; and
   (g) means to introduce heat into said furnace whereby scrap metal therein is heated.
4. The invention of claim 3 wherein:
   (a) said means to move said one wall portion includes a self-propelled wheeled vehicle.
5. The invention of claim 2 wherein:
   (a) said means to heat said furnace is located above the level of said scrap metal in said furnace; and including
   (b) means to exhaust said heat at a level below the bottom level of the scrap in said furnace.
6. The invention of claim 2 including:
   (a) a closure member covering the top of said furnace; and
   (b) means to seal the closure member to said furnace walls.

(References on following page)

References Cited

UNITED STATES PATENTS

| | | | |
|---|---|---|---|
| 706,972 | 8/1902 | Luhmann | 266—20 X |
| 729,009 | 5/1903 | Sutton | 266—20 X |
| 878,847 | 2/1908 | Williams | 214—35 X |
| 1,212,629 | 1/1917 | Greenawalt | 214—35 X |
| 1,917,247 | 7/1933 | Good | 214—35 |
| 2,574,388 | 11/1951 | Hardin | 214—35 X |
| 2,804,295 | 8/1957 | Brooke | 266—24 X |
| 2,818,247 | 12/1957 | Francis | 266—35 |
| 2,930,604 | 3/1960 | Thornhill | 266—20 |

JOHN F. CAMPBELL, *Primary Examiner.*

R. F. DROPKIN, *Assistant Examiner.*